(12) United States Patent
  Atkinson

(10) Patent No.: US 12,522,020 B2
(45) Date of Patent: Jan. 13, 2026

(54) METHOD AND APPARATUS FOR REMOVING A DUAL WHEEL SYSTEM

(71) Applicant: Atkinson Technologies LLC, Guys Mills, PA (US)

(72) Inventor: Carlin Atkinson, Guys Mills, PA (US)

(73) Assignee: Atkinson Technologies LLC, Guys Mills, PA (US)

( * ) Notice: Subject to any disclaimer, the term of this patent is extended or adjusted under 35 U.S.C. 154(b) by 0 days.

(21) Appl. No.: 18/983,844

(22) Filed: Dec. 17, 2024

(65) Prior Publication Data

US 2025/0196532 A1     Jun. 19, 2025

Related U.S. Application Data

(60) Provisional application No. 63/611,334, filed on Dec. 18, 2023.

(51) Int. Cl.
  *B60B 29/00*     (2006.01)
  *B60B 11/06*     (2006.01)

(52) U.S. Cl.
  CPC ............ *B60B 29/004* (2013.01); *B60B 11/06* (2013.01)

(58) Field of Classification Search
  CPC ... B60B 29/004; B60B 29/003; B60B 29/005; B60B 11/06
  See application file for complete search history.

(56) References Cited

U.S. PATENT DOCUMENTS

| | | | | |
|---|---|---|---|---|
| 1,654,009 | A | * | 12/1927 | Merten ................. B60B 29/008 29/264 |
| 3,638,294 | A | * | 2/1972 | Durant ................. B25B 27/026 29/252 |
| D282,450 | S | | 2/1986 | Richardson |
| D282,451 | S | | 2/1986 | Richardson |
| 4,771,528 | A | * | 9/1988 | Stromberg ............ B25B 27/023 29/259 |
| 4,989,312 | A | * | 2/1991 | Maddalena ........... B25B 27/023 29/259 |
| D359,021 | S | | 6/1995 | Snook |
| 6,012,211 | A | * | 1/2000 | Ochoa ................... B60B 29/001 29/259 |

(Continued)

OTHER PUBLICATIONS

Atkinson wheel removal tool with imagery, https://www.youtube.com/watch?v=QOH-sLpUpf8, Oct. 20, 2023 (Year: 2023).

(Continued)

*Primary Examiner* — Seahee Hong
(74) *Attorney, Agent, or Firm* — Sand, Sebolt & Wernow Co., LPA

(57) ABSTRACT

A dual wheel removal tool for assisting in the removal of a wheel of a dual wheel system of a vehicle. The removal tool includes a torque plate having a first end, a second end opposite to the first end, and a peripheral edge defined therebetween. The removal tool also includes a socket formed with the torque plate at one of the first end and the second end. The removal tool may optionally include a plurality of lug cutouts defined in the torque plate and extends into the peripheral edge between the first end and the second end. The first end and the second end of the torque plate are in fluid communication with one another at each lug cutout of the plurality of lug cutouts.

15 Claims, 8 Drawing Sheets

(56) References Cited

U.S. PATENT DOCUMENTS

| | | | |
|---|---|---|---|
| 6,305,061 B1* | 10/2001 | King | B25B 27/023 |
| | | | 29/259 |
| D653,523 S | 2/2012 | Wackwitz | |
| 9,969,214 B1* | 5/2018 | Gesto | B25B 27/023 |
| D873,099 S | 1/2020 | Kaye, Jr. | |
| 11,123,828 B1* | 9/2021 | Liu | B23P 19/02 |
| D980,696 S | 3/2023 | Liao | |
| D1,047,849 S | 10/2024 | Liu | |
| 2009/0051094 A1 | 2/2009 | Sandmeier | |
| 2015/0121675 A1* | 5/2015 | Campoli | B25B 27/0035 |
| | | | 29/266 |
| 2025/0196532 A1 | 6/2025 | Atkinson | |

OTHER PUBLICATIONS

Atkinson wheel removal tool, https://www.youtube.com/watch?v=QOH-sLpUpf8, Oct. 20, 2023 (Year: 2023).

\* cited by examiner

METHOD AND APPARATUS FOR REMOVING A DUAL WHEEL SYSTEM

REFERENCE TO RELATED APPLICATIONS

This application claims the benefit of U.S. Provisional Application Ser. No. 63/611,334, filed on Dec. 18, 2023; the disclosure of which is incorporated herein by reference.

TECHNICAL FIELD

This disclosure is directed to a tool for removing a wheel from a dual wheel system of a vehicle.

BACKGROUND ART

Dual wheel system are versatile systems used in a wide range of vehicles, including drivable outdoor power equipment devices such as trucks, all-terrain vehicles, lawn-mowing units, and other similar drivable outdoor power equipment devices. With respect to lawn mowing units, the inclusion of a dual wheel system is designed to increase the stability, traction, and safety when traverse sloped lawns. More so, with respect to the lawn mowing units, the inclusion of a dual wheel system reduces soil compaction on delicate or impressionable grounds.

While such dual wheel systems are beneficial, the removal of an outer wheel from a conventional dual wheel system for repair or maintenance reasons may require extensive labor and time. Generally, a dual wheel system may include a main drive hub or inner hub that engages with an inner wheel of the dual wheel system, and an axle extension assembly that engages with an outer wheel of the dual wheel system and mounts with the inner hub. With such configuration, a user may need to take multiple steps in order to remove the outer wheel from the inner hub. Such actions of disengaging and removing outer wheel of the dual wheel system from the inner hub may be extremely difficult for a single user. As such, the user may need to reply upon and have access to various tools and/or devices to remove such outer wheel if the axle extension assembly is frozen to the inner hub. However, such tools may place the user and/or operators in dangerous situations when trying to disengage and remove an outer wheel based on how these tools are attached with the outer wheel and connected with one another.

SUMMARY OF THE INVENTION

The presently disclosed dual wheel removal tool (hereinafter "removal tool") assists a user in loosening and removing the axle extension assembly and the outer wheel from an inner hub simultaneously. The presently disclosed removal tool includes a torque plate that operably engages with lug nuts of the outer wheel to provide a first point of contact. The presently disclosed removal tool also includes a socket that operably engages with the torque plate and connects with a draw bolt of the axle extension assembly to provide a second point of contact. With such two points of contact by the removal tool, the removal tool receives rotational force from a torque assisting tool that is engaged with the draw bolt so that the removal tool may apply the same rotational force to the hub or lug nuts of the outer wheel.

In one aspect, an exemplary embodiment of the present disclosure may provide a dual wheel removal tool. The dual wheel removal tool includes a torque plate that has a first end, a second end opposite to the first end, and a peripheral edge defined therebetween. The dual wheel removal tool also includes a socket that operably engages with the torque plate at one of the first end and the second end. The dual wheel removal tool also includes at least one lug cutout that is defined in the torque plate and extends into the peripheral edge between the first end and the second end.

In another aspect, an exemplary embodiment of the present disclosure may provide a dual wheel removal tool. The dual wheel removal tool includes a torque plate that has a first end, a second end opposite to the first end, and a peripheral edge defined therebetween. The dual wheel removal tool also includes a socket that is formed with the torque plate at one of the first end and the second end. The dual wheel removal tool also includes a plurality of lug cutouts defined in the torque plate and extends into the peripheral edge between the first end and the second end, wherein the first end and the second end of the torque plate are in fluid communication with one another at each lug cutout of the plurality of lug cutouts.

In another aspect, an exemplary embodiment of the present disclosure may provide a method of removing a wheel from a dual wheel drive system of a vehicle. The method includes steps of: engaging a dual wheel removal tool with a draw bolt of the dual wheel drive system and a hub of the wheel simultaneously; engaging a torque assisting tool with the dual wheel removal tool; applying a first rotational force on the dual wheel removal tool with the torque assisting tool; disengaging the draw bolt of the dual wheel drive system from a main drive hub of the dual wheel drive system; and removing the wheel from the dual wheel drive system of the vehicle.

In yet another aspect, an exemplary embodiment of the present disclosure may provide a dual wheel removal tool. The tool includes a torque plate having a first end, a second end opposite to the first end, and a peripheral edge defined therebetween, wherein the torque plate is adapted to engage with at least two lug nuts of a dual wheel system of a vehicle; a socket operably engaged with the torque plate at one of the first end and the second end and being adapted to engage with a draw bolt of an axle extension assembly of the dual wheel system; and at least two lug cutouts defined in the torque plate and extends into the peripheral edge between the first end and the second end.

This exemplary embodiment or another exemplary embodiment may further include that the dual wheel removal tool is configured to disengage the axle extension assembly that supports an outer wheel from an inner hub that supports an inner wheel. This exemplary embodiment or another exemplary embodiment may further include that the socket is adapted to enable a terminal end of the draw bolt to extend through the dual wheel removal tool. This exemplary embodiment or another exemplary embodiment may further include that the socket comprises: a driver fixedly engaged with the torque plate. This exemplary embodiment or another exemplary embodiment may further include a central opening defined in the torque plate that extends between a front surface of the torque plate and a rear surface of the torque plate; and a driver opening defined in the driver that extends between a front end of the driver and a rear end of the driver; wherein the central opening and the driver opening are aligned with and operatively in communication with one another. This exemplary embodiment or another exemplary embodiment may further include that the driver further comprises: a set of internal engagement walls defining the driver opening and configured to engage with the draw bolt of the axle extension assembly of the dual wheel system. This exemplary embodiment or another exemplary embodiment may further include that the socket comprises: a driver; and an extension operably engaged with the driver and the torque plate; wherein the driver is spaced apart from the torque plate by the extension. This exemplary embodiment or another exemplary embodiment may further include that the extension comprises: a first end of the extension that operably engages with the driver of the socket; a second end of the extension opposite to the first end of the extension and operably engages with and positioned inside of the torque plate; and a passageway defined between the first end of the extension and the second end of the extension. This exemplary embodiment or another exemplary embodiment may further include a central opening defined in the torque plate; a driver opening defined in the driver; and wherein the passageway, the central opening, and the driver opening are coaxial with one another. This exemplary embodiment or another exemplary embodiment may further include that the driver further comprises: a set of internal engagement walls defining the driver opening and configured to engage with the draw bolt of the axle extension assembly of the dual wheel system. This exemplary embodiment or another exemplary embodiment may further include a first inner diameter defined by the driver opening; and a second inner diameter defined by the passageway that is greater than first inner diameter. This exemplary embodiment or another exemplary embodiment may further include a first outer diameter defined by the torque plate; a second outer diameter defined by the extension that is less than the first diameter; and a third outer diameter defined by the driver that is less than the first diameter and is greater than the second diameter. This exemplary embodiment or another exemplary embodiment may further include that the lug cutouts are curvilinear-shaped.

In yet another aspect, an exemplary embodiment of the present disclosure may provide a method of disengaging an outer wheel from a dual wheel drive system of a vehicle. The method includes steps of: engaging a dual wheel removal tool with an axle extension assembly of the dual wheel, wherein the axle extension assembly supports the outer wheel and operably engages with an inner hub of the dual wheel drive system that support an inner wheel of the vehicle; engaging a torque assisting tool with the axle extension assembly; applying a first rotational force on the dual wheel removal tool and the axle extension assembly with the torque assisting tool; and disengaging the outer wheel and the axle extension assembly, collectively, from the inner hub of the dual wheel drive system.

This exemplary embodiment or another exemplary embodiment may further include that the step of engaging the dual wheel removal tool with the axle extension assembly of the dual wheel further comprises: engaging a socket of the dual wheel removal tool with a draw bolt of the axle extension assembly; and engaging a torque plate of the dual wheel removal tool with at least two lug nuts secured to at least two lug studs of a draw cone of the axle extension assembly. This exemplary embodiment or another exemplary embodiment may further include that the step of applying the first rotational force on the dual wheel removal tool and the axle extension assembly further comprises: applying the first rotational force on the draw bolt by the socket of the dual wheel removal tool and on the at least two lug nuts and the at least two lug studs by the torque plate of the dual wheel removal tool, simultaneously. This exemplary embodiment or another exemplary embodiment may further include that the step of engaging the dual wheel removal tool with the axle extension assembly of the dual wheel further comprises: engaging a socket of the dual wheel removal tool with a draw bolt of the axle extension assembly. This exemplary embodiment or another exemplary embodiment may further include that the step of applying the first rotational force on the dual wheel removal tool and the axle extension assembly further comprises: applying the first rotational force on the draw bolt by the socket of the dual wheel removal tool to loosen from the inner hub of the dual wheel drive system. This exemplary embodiment or another exemplary embodiment may further include that the step of engaging the dual wheel removal tool with the axle extension assembly of the dual wheel further comprises: engaging a torque plate of the dual wheel removal tool with at least two lug nuts secured to at least two lug studs of a draw cone of the axle extension assembly. This exemplary embodiment or another exemplary embodiment may further include a step of applying a second rotational force on the draw bolt by the socket of the dual wheel removal tool and on the at least two lug nuts and the at least two lug studs by the torque plate of the dual wheel removal tool, simultaneously.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

FIGS. 1-4 illustrate a dual wheel removal tool (hereinafter as "removal tool") generally referred to as 10. In the present disclosure, removal tool 10 is configured to engage with a selected outer wheel and a selected dual wheel system of a tractor so that an operator or user of the tractor may assisted in removing the outer wheel from the tractor. Particularly, and as discussed in greater detail below, the removal tool 10 engages with lug nuts of the selected outer wheel and a draw bolt of the selected dual wheel system of the tractor so that an operator or user of the tractor may be assisted in removing the outer wheel from the tractor. Such features and components of the removal tool 10 are now discussed in greater detail below.

Figure 1:
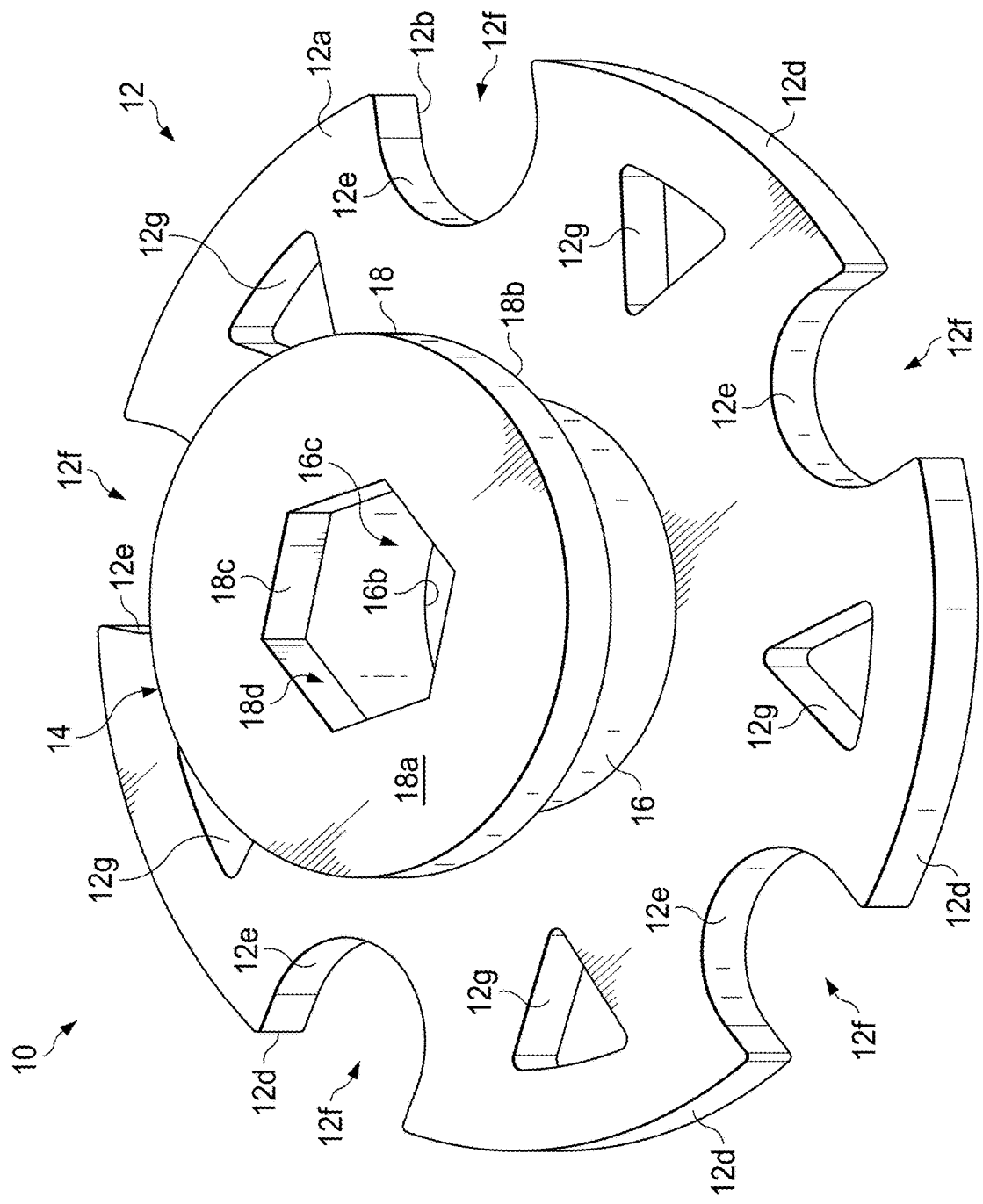
FIG. 1 (FIG. 1) is a front perspective view of a dual wheel removal tool (hereinafter "removal tool") in accordance with one aspect of the present disclosure.
Figure 3:
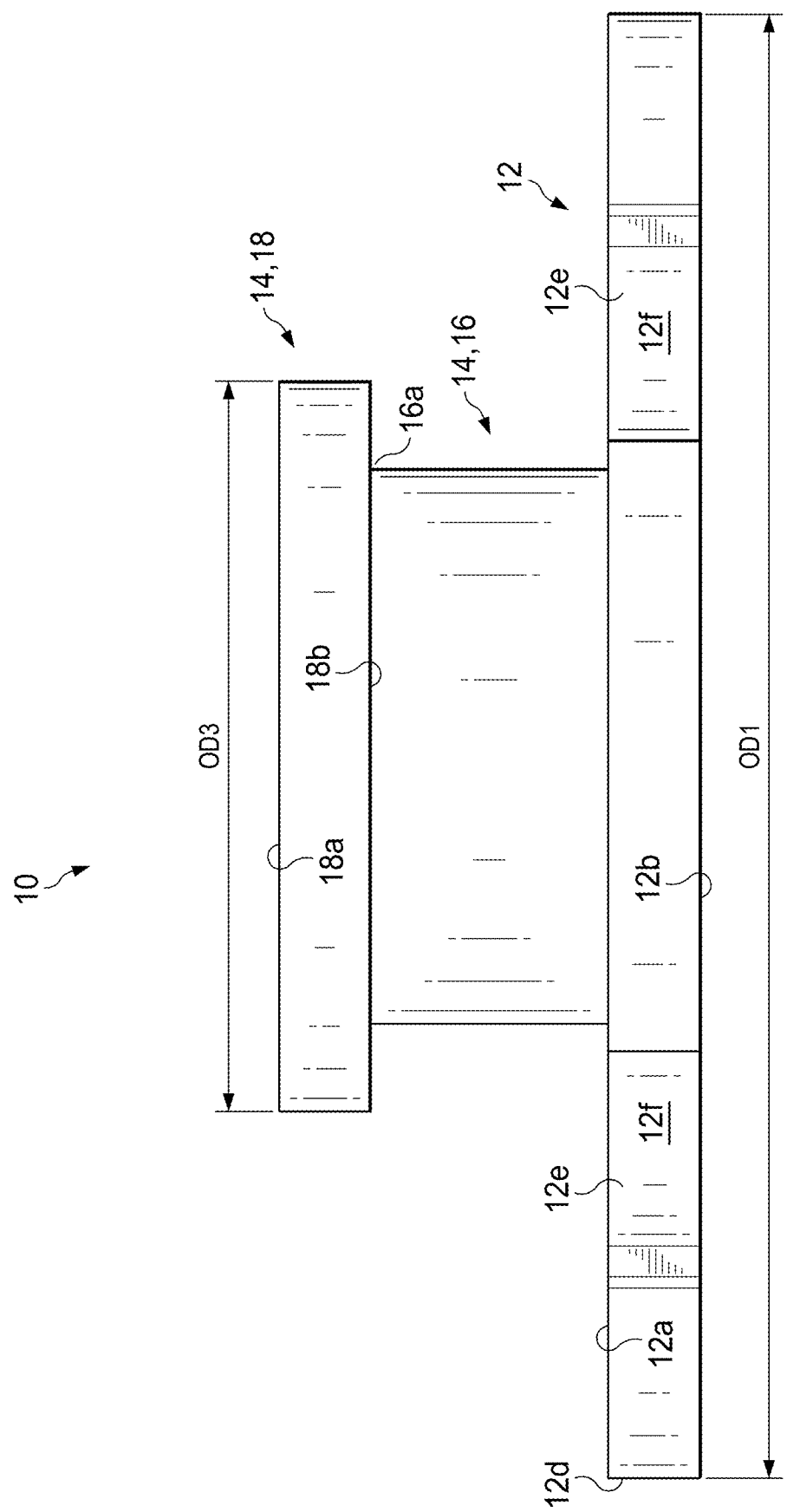
FIG. 3 (FIG. 3) is a side elevation view of the removal tool shown in FIG. 1.
Figure 4:
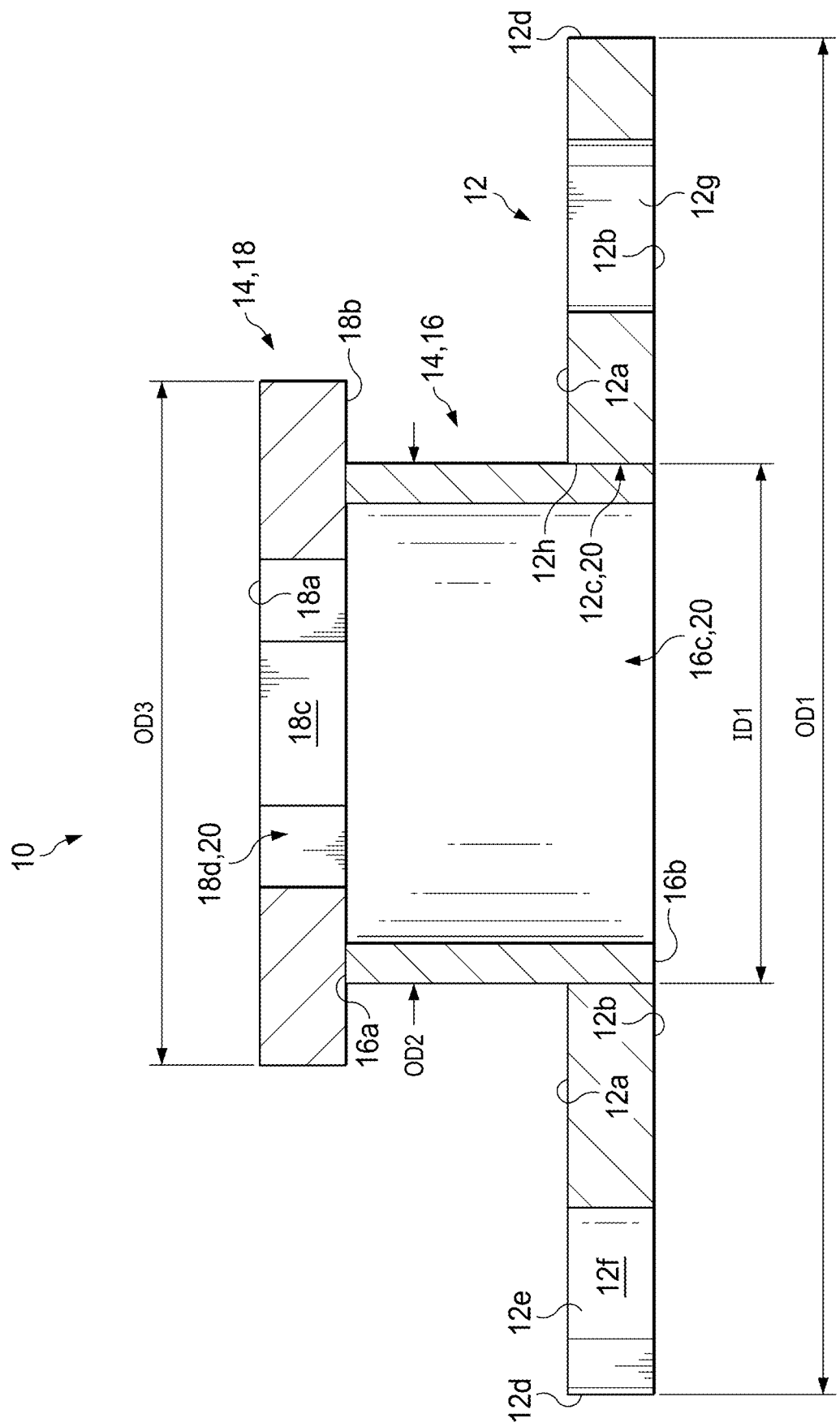
FIG. 4 (FIG. 4) is a sectional view of the removal tool taken in the direction of line 4-4 shown in FIG. 2.

Removal tool 10 includes a torque plate 12. As best seen in FIGS. 1 and 3, the torque plate 12 includes a front surface 12a, a rear surface 12b that is opposite to the front surface 12a and faces away from the rear surface 12b, and a central opening 12c defined in the torque plate 12 between the front surface 12a and the rear surface 12b. As best seen in FIG. 4, the central opening 12c extends entirely through the torque plate 12 along an axis that intersects the front surface 12a and the rear surface 12b. With this configuration, the front surface 12a and the rear surface 12b are in operative communication with one another at the central opening 12c.

Still referring to torque plate 12, torque plate 12 also includes a peripheral wall 12d. As best seen in FIG. 3, the peripheral wall 12d extends between the front surface 12a and the rear surface 12b and is spaced apart from the central opening 12c. Torque plate 12 also includes a plurality of internal engagement walls 12e that extends inwardly from the peripheral wall 12d towards the central opening 12c. Each internal engagement wall of the plurality of internal engagement walls 12e defines a lug cutout 12f for housing a respective lug nut of a wheel of the tractor; such engagement of the torque plate 12 with lug nuts of a wheel of the tractor is discussed in greater detail below. The peripheral wall 12d of torque plate 12 also defines a first outer diameter (OD1) (see FIG. 2).

It should be understood that torque plate 12 may include any suitable number of internal engagement walls that defines a corresponding number of lug cutouts so that the torque plate 12 engages with a suitable number of lug nuts of a wheel of a tractor. Examples of suitable numbers of internal engagement walls defining corresponding lug cutouts of a torque plate include, one, at least one, two, three, four, five, six, and other suitable numbers of internal engagement walls that define corresponding lug cutouts. In the present disclosure, torque plate 12 includes five internal engagement walls 12e that defines five respective lug cutouts 12f so that the torque plate 12 engages with five lug nuts of a wheel of a tractor.

Figure 2:
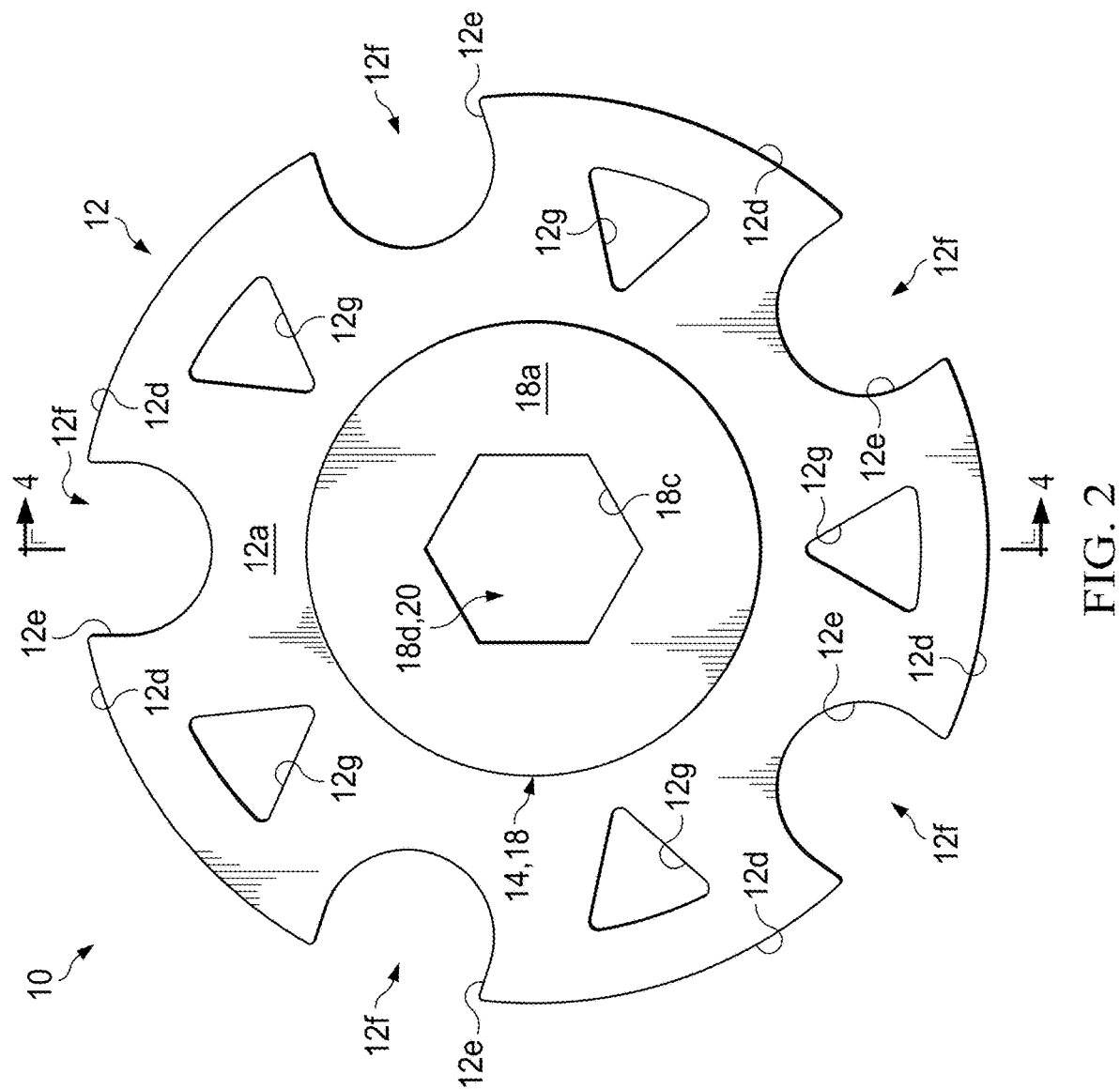
FIG. 2 (FIG. 2) is a front elevation view of the removal tool shown in FIG. 1.

It should also be understood that each internal engagement walls of the plurality of internal engagement walls 12e of the torque plate 12 may define any suitable two-dimensional shape when viewed from a front elevation view (see FIG. 2). Such two-dimensional shape defined by each internal engagement walls may be based on various considerations, including the size, shape, or configuration of lugs that the plurality of internal engagement walls 12e will engage. Examples of suitable two-dimensional shapes defined by internal engagement walls of a torque plate include circular, curvilinear, arcuate, square, rectangular, triangular, pentagonal, hexagonal, octagonal, and other suitable shapes defined by internal engagement walls of a torque plate. In the present disclosure, each internal engagement walls of the plurality of internal engagement walls 12e of the torque plate 12 defines an arcuate shape when viewed from a front elevation view (see FIG. 2).

Torque plate 12 also defines a set of apertures 12g. As best seen in FIG. 2, each aperture of the set of apertures 12g is defined between the central opening 12c and the peripheral wall 12d. As best seen in FIG. 4, each aperture of the set of apertures 12g extends entirely through the torque plate 12 along an axis that intersects the front surface 12a and the rear surface 12b. With such configuration, the front surface 12a and the rear surface 12b are in operative communication with one another at each aperture of the set of apertures 12g.

Such inclusion of the set of apertures 12g may improve the balance of the removal tool when keeping the removal tool 10 engaged with lug nuts of a dual wheel system, which is discussed in greater detail below. Such inclusion of the set of apertures 12g may also lighten and/or remove excessive weight from the removal tool 10. In one exemplary embodiment, one or more of the apertures of the set of apertures 12g may be used so that the removal tool 10 may be hung from a hook or fastener for storage purposes.

It should also be understood that each aperture of the set of apertures 12g of the torque plate 12 may define any suitable two-dimensional shape when viewed from a front elevation view (see FIG. 2). Such two-dimensional shape defined by each aperture may be based on various considerations, including the size and shape of the torque plate. Examples of suitable two-dimensional shapes of each aperture include circular, curvilinear, arcuate, square, rectangular, triangular, pentagonal, hexagonal, octagonal, and other suitable shapes. In the present disclosure, each aperture of the set of apertures 12g of the torque plate 12 defines a triangular shape when viewed from a front elevation view (see FIG. 2).

Torque plate 12 also includes an internal central wall 12h. As best seen in FIG. 4, internal central wall 12h defines the central opening 12c having a first inner diameter; such first inner diameter is denoted by arrows labeled ID1 in FIG. 4. Such use and purpose of internal central wall 12h is discussed in greater detail below.

Removal tool 10 also includes a socket 14 that operably engages with the torque plate 12. As best seen in FIG. 3, the socket 14 includes an extension 16 that operably engages with the torque plate 12. As best seen in FIG. 4, the extension 16 includes a front end 16a that is spaced apart from the torque plate 12, a rear end 16b that operably engages with the torque plate 12 and is opposite to the front end 16a, and a passage 16c defined therebetween. In the present disclosure, the rear end 16b is housed inside of the central opening 12c of the torque plate 12. As such, the extension 16 operably engages with the internal central wall 12h of torque plate 12 inside of the central opening 12c. Extension 16 also defines a second outer diameter (OD2 shown in FIG. 4) that is less than the first outer diameter OD1 of the torque plate 12 and less than the first inner diameter ID1 of torque plate 12.

In other exemplary embodiments, the second outer diameter OD2 of extension 16 may define any suitable size when compared to the first outer diameter OD1 of the torque plate 12 and the first inner diameter ID1 of torque plate 12. In one exemplary embodiment, the second outer diameter OD2 may be equal with the first outer diameter OD1 of the torque plate 12. In another exemplary embodiment, the second outer diameter OD2 may be greater than the first outer diameter OD1 of the torque plate 12. In yet another exemplary embodiment, the second outer diameter OD2 may be equal with the first inner diameter ID1 of the torque plate 12. In yet another exemplary embodiment, the second outer diameter OD2 may be greater than the first inner diameter ID1 of the torque plate 12.

Socket 14 also includes an engagement member or draw bolt driver (hereinafter "driver") 18 that operably engages with the extension 16. As best seen in FIGS. 3 and 4, the driver 18 includes a front end 18a that is spaced apart from the torque plate 12 and the extension 16, and a rear end 18b that operably engages with the extension 16 and is opposite to the front end 18a. In the present disclosure, driver 18 operably engages with the extension 16 at the front end 16a and is positioned outside of the passage 16c. Driver 18 also includes an internal engagement wall 18c that extends between the front end 18a and the rear end 18b and defines an opening 18d. As best seen in FIG. 4, the front end 18a and the rear end 18b are in operative communication with one another at the opening 18d defined by internal engagement wall 18c. Driver 18 also defines a third outer diameter (OD3 shown in FIG. 2) that is less than the first outer diameter OD1 of the torque plate 12 and greater than the second outer diameter OD2 of extension 16.

It should be understood that internal engagement wall 18c of the driver 18 may define any suitable shape when viewed from a front elevation view (see FIG. 2). Such shape defined by the internal engagement wall 18c may be based on various considerations, including the size, shape, or configuration of a draw bolt of a dual wheel system of a tractor that the internal engagement wall 18c will engage. Examples of suitable shapes defined by an engagement wall of a socket include circular, curvilinear, arcuate, square, rectangular, triangular, pentagonal, hexagonal, octagonal, and other suitable shapes defined by internal engagement walls of a torque plate. In the present disclosure, engagement wall 18c of the driver 18 defines a hexagonal shape when viewed from a front elevation view (see FIG. 2). With such configuration, the internal engagement wall 18c may be collectively defined by six facets or walls in which the internal engagement wall 18c may engage with a member that has six matching facets or walls (such as a draw bolt of a dual wheel system).

In the present disclosure, driver 18 of socket 14 only includes the internal engagement wall 18c that is configured to engage with a draw bolt of a dual wheel system (or a similar component of a dual wheel system) to remove at least an outer wheel of a dual wheel system of a tractor. In other exemplary embodiments, one or more components of removal tool 10 may include an internal engagement wall 18C that engages a draw bolt of a dual wheel system (or a similar component of a dual wheel system) to remove at least an outer wheel of a dual wheel system of a tractor. In one exemplary embodiment, the internal central wall 12h of torque plate 12 may be configured to engage with a draw bolt of a dual wheel system (or a similar component of a dual wheel system) in conjunction with the internal engagement wall 18c of driver 18; as such, the torque plate 12 would engage with the draw bolt at a first position, and the driver 18 would engage with the draw bolt at a second position. In another exemplary embodiment, the extension 16 may be configured to engage with a draw bolt of a dual wheel system (or a similar component of a dual wheel system) in conjunction with the internal engagement wall 18c of driver 18; as such, the torque plate 12 would engage with the draw bolt at a first position, and the extension 16 would engage with the draw bolt at a second position. In yet another exemplary embodiment, the internal central wall 12h of torque plate 12 and extension 16 may be configured to engage with a draw bolt of a dual wheel system (or a similar component of a dual wheel system) in conjunction with the internal engagement wall 18c of driver 18; as such, the torque plate 12 would engage with the draw bolt at a first position, the extension 16 would engage with the draw bolt at a second position, and the driver 18 would engage with the draw bolt at a third position.

In other exemplary embodiments, the third outer diameter OD3 of driver 18 may define any suitable size when compared to the first outer diameter OD1 of the torque plate 12 and the outer diameter OD2 of extension 16. In one exemplary embodiment, the third outer diameter OD3 may be equal with the first outer diameter OD1 of the torque plate 12. In another exemplary embodiment, the third outer diameter OD3 may be greater than the first outer diameter OD1 of the torque plate 12. In yet another exemplary embodiment, the third outer diameter OD3 may be equal with the second outer diameter OD1 of the torque plate 12.

While removal tool 10 includes torque plate 12, the extension 16, and driver 18, one or more components may be removed and/or omitted from removal tool 10. In one exemplary embodiment, an exemplary removal tool may only include a torque plate and a driver that operably engages with the torque plate and removes the extension. Such embodiment may be advantageous the overall height of the removal tool 10 (measured from the torque plate 12 to the driver 18)

In the present disclosure, the torque plate 12, the extension 16, and driver 18 are in operative communication with one another at the central opening 12c of torque plate 12, the passage 16c of the extension 16, and the opening 18d of the driver 18. As such, the torque plate 12, the extension 16, and driver 18 collectively define a main or central passageway 20 due to the central opening 12c, the passage 16c, and the opening 18d. As discussed in greater detail below, a draw bolt of a dual wheel system of a tractor is passed through the central passageway 20 and engages with the internal engagement wall 18c of driver 18 for loosening and removing said draw bolt and connected wheel from the tractor.

Having now discussed components and elements of removal tool 10, a method of removing at least one wheel of a dual wheel system of a tractor with the removal tool 10 is discussed in greater detail below.

Prior to discussing operation, vehicle or tractor 30 may include a frame 32 that operably engages with pairs of ground engaging wheels 34. Each wheel of the set of ground engaging wheels 34 includes a hub 35 that engages with and/or mounts to a dual wheel system 36 of tractor 30. In the present disclosure, each dual wheel system of the set of dual wheel systems 36 includes a main drive hub or inner hub 38 (see FIG. 5D) that operably engages with an inner wheel 34a of each pair of ground engaging wheels 34. Each dual wheel system of the set of dual wheel systems 36 also includes an axle extension assembly 40 (see FIG. 5B) that operably engages with an outer wheel 34b of each pair of ground engaging wheels 34. The axle extension assembly 40 includes a draw cone 40a that engages with the hub 35 of the outer wheel 34b, draw bolt 40b that engages with the draw cone 40a passes through the hub 35 of the outer wheel 34b, a set of lug studs 40c provided with the draw cone 40a and for engaging the outer wheel 34b with the draw bolt 40b, and a set of lug nuts 40d that secure the outer wheel 34b with the set of lug studs 40c.

It should be understood that tractor 30 may be any tractor or similar vehicle, commercially-available or commercially-unavailable at the time of filing this disclosure, that includes dual wheel systems. In one exemplary embodiment, and as illustrated herein, tractor 30 may be a Ventrac 4000 series tractor equipped with Ventrac Dual Wheel Kits.

Figure 5A:
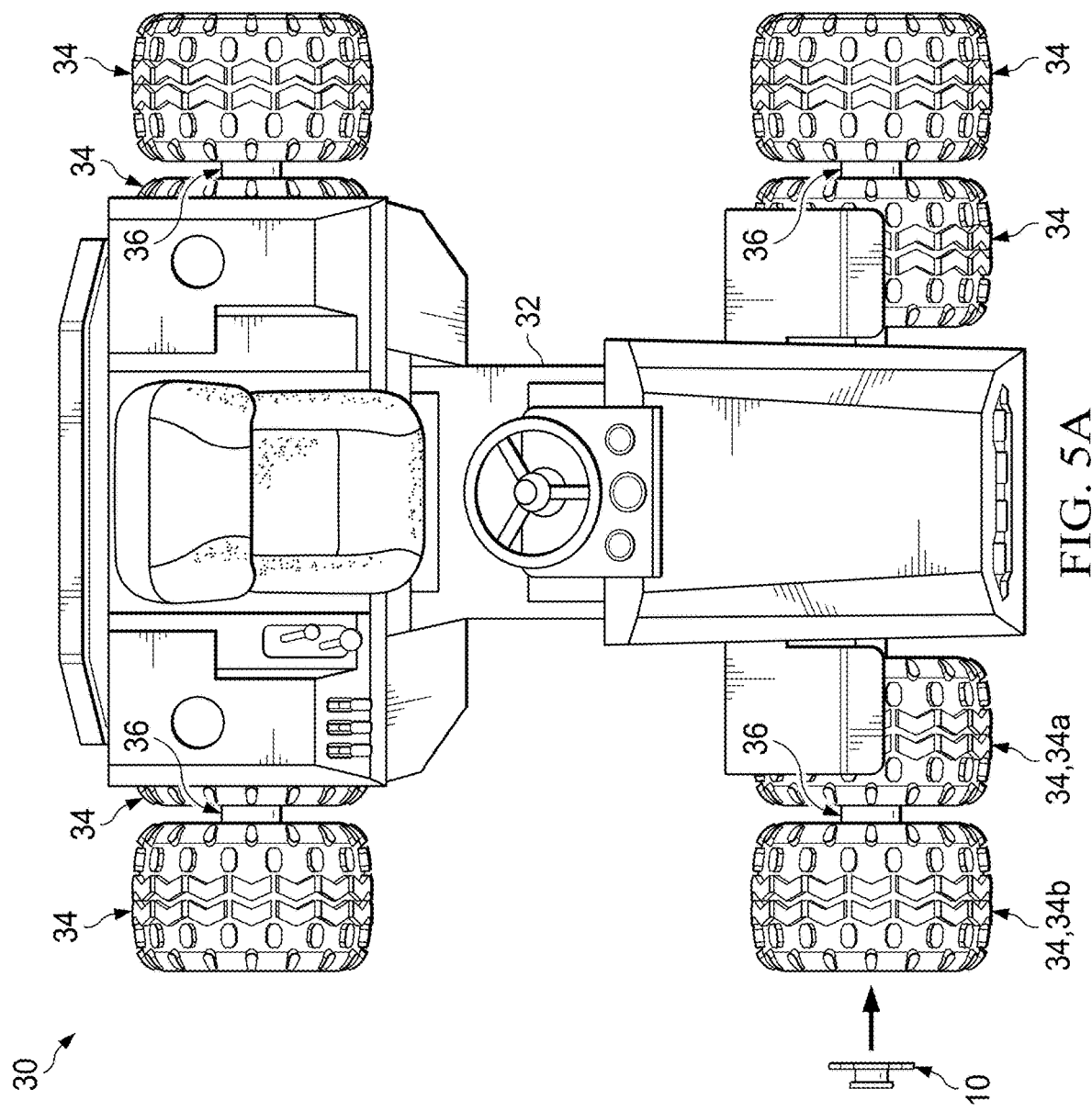
FIG. 5A (FIG. 5A) is an operational view of introducing the removal tool to a selected outer wheel of a selected dual wheel system of a tractor.

To remove an outer wheel 34b from the tractor 30, the user begins by introducing the removal tool 10 to the selected outer wheel 34b. As best seen in FIG. 5A, the removal tool 10 is introduced to the front right outer wheel 34b of the tractor 30. As the removal tool 10 is introduced to the selected outer wheel 34b, the draw bolt 40b passes through the central passageway 20 and engages with the driver 18 inside of the opening 18d, particularly the internal engagement wall 18c (see FIG. 5B). More particularly, the draw bolt 40b initially passes through the central opening 12c of torque plate 12, then through the passage 16c of extension 16, and lastly through the opening 18d before engaging with the internal engagement wall 18c of driver 18.

Figure 5B:
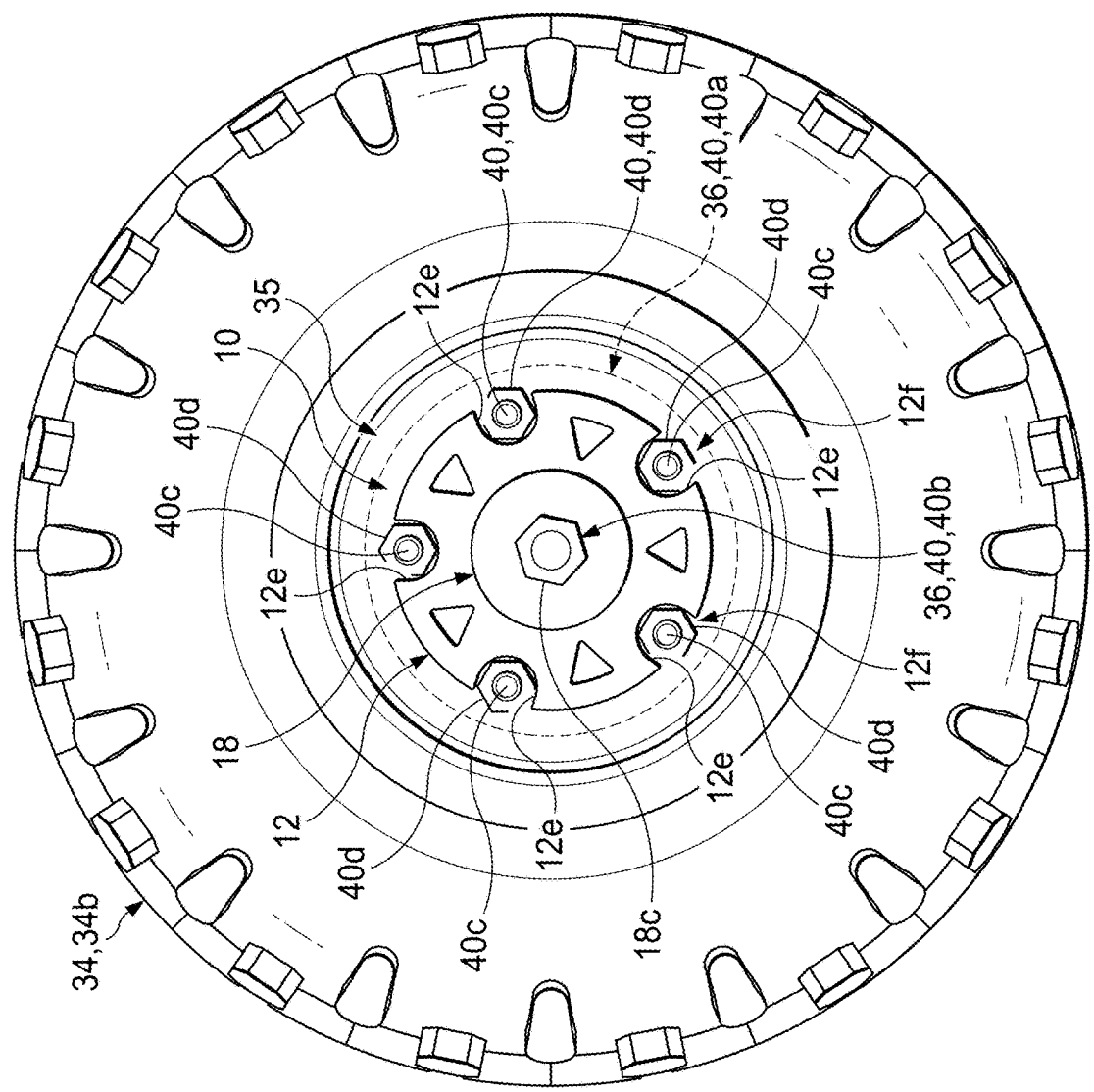
FIG. 5B (FIG. 5B) is another operational view that continues from FIG. 5A, but the removal tool is engaged with an axle extension assembly of the selected dual wheel system.

Once the draw bolt 40b has passed through the removal tool 10 and engages with the driver 18, the user may then engages the torque plate 12 with the lug nuts 40d. As best seen in FIG. 5B, each lug nut 40d is received by a lug cutout 12f defined in the torque plate 12 and engages with a respective internal engagement wall of the plurality of internal engagement walls 12e. Upon such engagement between the torque plate 12 and the lug nuts 40d, the rear surface 12b of the torque plate 12 may also abut the hub 35 of the outer wheel 34b. In this particular embodiment, the peripheral wall 12d of torque plate 12 is also spaced apart from and free from engaging with the hub 35 once the removal tool 10 is engaged with the draw bolt 40b and the lug nuts 40d. Once the removal tool 10 engages with the lug nuts 40d, the removal tool 10 secures and/or locks the draw bolt 40b with the hub 35 of the outer wheel 34b (see FIG. 5B). As discussed in greater detail below, such engagement by the removal tool 10 allows the outer wheel 34b and the respective axle extension assembly 40 to be loosened simultaneously from the inner hub 38.

Figure 5C:
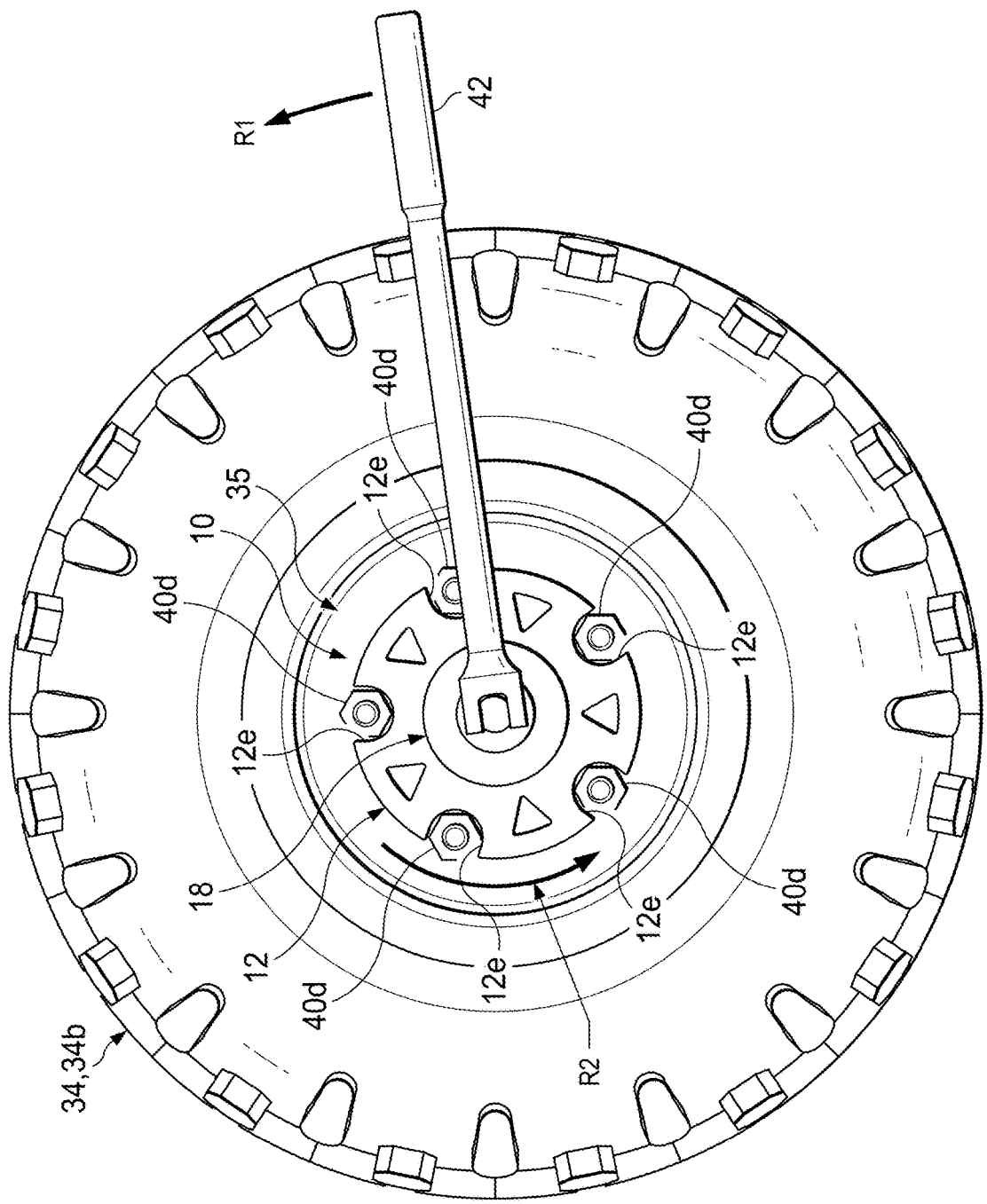
FIG. 5C (FIG. 5C) is another operational view that continues from FIG. 5B, but a torque assisting tool is engaged with the axle extension assembly of the selected dual wheel system, wherein the torque assisting tool and removal tool apply a rotational force on the axle extension assembly and the selected outer wheel.
Figure 5D:
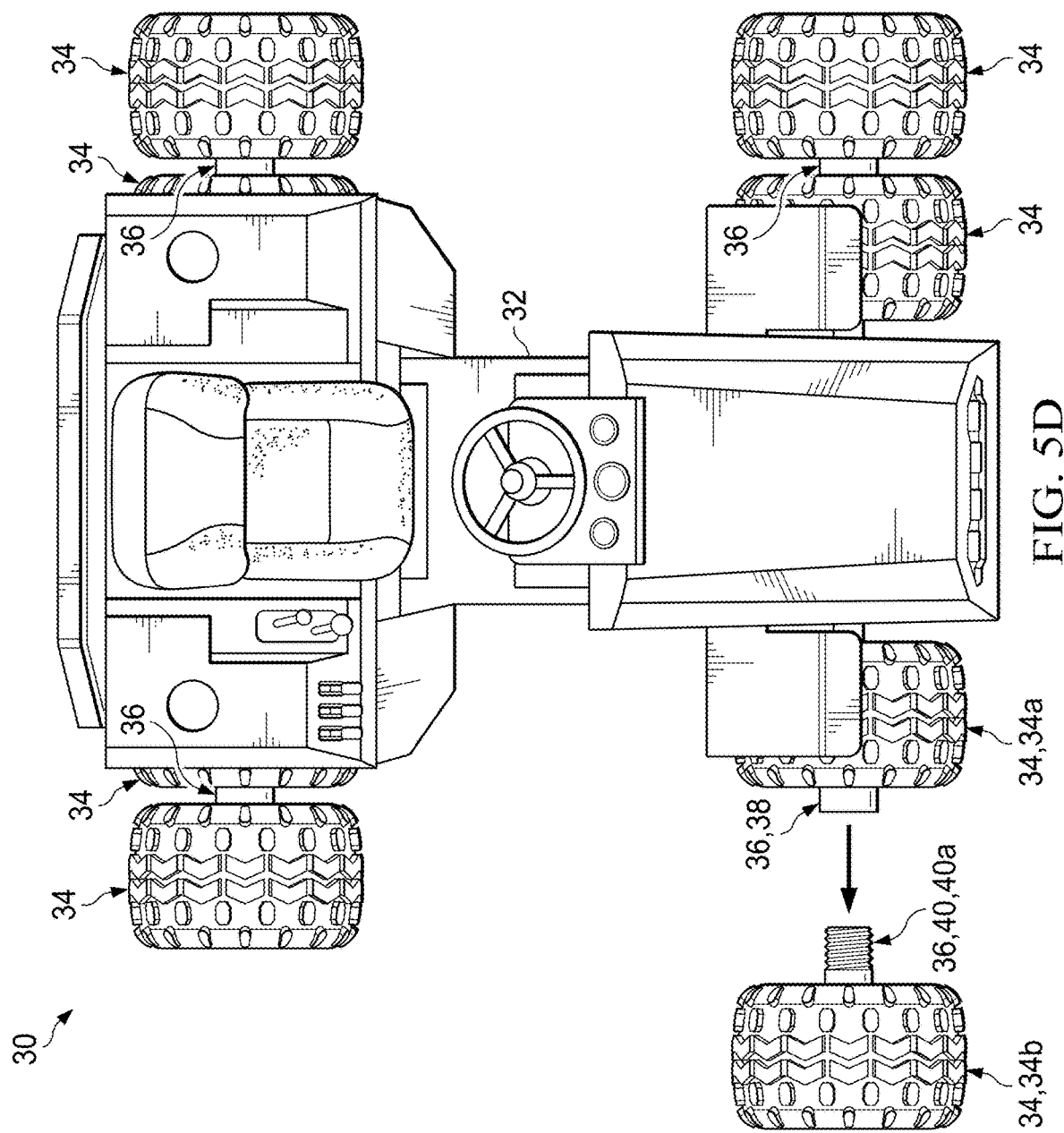
FIG. 5D (FIG. 5D) is another operational view similar to FIG. 5C, but the axle extension assembly and the selected outer wheel are collectively removed from the tractor.

Once the removal tool 10 is engaged with the draw bolt 40b and the lug nuts 40d, the user may then introduce and engage a torque assisting tool 42 to the draw bolt 40b (see FIG. 5C). In one exemplary embodiment, torque assisting tool 42 may be a breaker bar or similar ratcheting tool that is equipped with a socket or driver that matches the structural configuration of the draw bolt 40b. Once the torque assisting tool 42 is engaged with the draw bolt 40b, the user may then apply a first rotational force or loosening force on the torque assisting tool 42 to loosen the draw bolt 40b from the main drive hub 38; such first rotational force applied on the torque assisting tool 42 is denoted by an arrow pointed in the counterclockwise direction and is labeled "R1" in FIG. 5C.

Upon such application of rotational force on the torque assisting tool 42, the removal tool 10 simultaneously applies a loosening force due to the removal tool 10 being engaged with the draw bolt 40b. As best seen in FIG. 5C, removal tool 10 simultaneously applies a second rotational force or loosening force on the hub 35, particularly at the lug nuts 40d, in the same rotational direction due to the first rotational force being applied by the torque assisting tool 42; such second rotational force applied by the removal tool 10 is denoted by an arrow pointed in the counterclockwise direction and is labeled "R2" in FIG. 5C. With such engagement between the removal tool 10 and the lug nuts 40d, the outer wheel 34b is loosened simultaneously with the draw bolt 40b as the user continues to apply rotational force on the torque assisting tool 42. It should be understood that the first rotational force applied by the torque assisting tool 42 is transferred to the removal tool 10 in generating the second rotational force on the hub 35, at the lug nuts 40d, due to the engagement between the removal tool 10 and the draw bolt 40b. Once the outer wheel 34b and the draw bolt 40b are loosened from the inner hub 38, the outer wheel 34b and the axle extension assembly 40 may be removed from the tractor 30 (see FIG. 5D).

Such engagement between the removal tool 10, outer wheel 34b, the draw bolt 40b, and torque assisting tool 42 is considered advantageous at least because the outer wheel 34b and the draw bolt 40b are simultaneously loosened and disengaged from the inner hub 38 by the combination of the removal tool 10 and the torque assisting tool 42. Such simultaneous loosening and disengagement of the outer tires 34b and the axle extension assembly 40 from the tractor 30 by the removal tool 10 and the torque assisting tool 42 reduces the overall labor and time when performing such removal operations. Moreover, such inclusion of the removal tool 10 with the torque assisting tool 42 is beneficial in loosening frozen and/or fixed outer wheel 34b from the inner hub 38 without using additional tools or devices that would increase labor and time. As such, the removal tool 10 discussed and illustrated herein removes the conventional operations of loosening and removing the draw bolt 40b and the outer wheel 34b at separate time intervals.

In an alternative method, a user may initially apply the first rotational force on the torque assisting tool 42 to loosen and disengage the draw bolt 40b from the inner hub 38. It should be noted that in this alternative method, the removal tool 10 is engaged with the draw bolt 40b, particularly the driver 18, while being spaced apart from the hub 35 and/or the lug studs 40c, particularly the torque plate 12. Once the draw bolt 40b has been loosened from the inner hub 38, the user may then engage the torque plate 12 with the hub 35, at the lug nuts 40d, prior to reapplying the first rotational force on the torque assisting tool 42. Upon engagement, the user then reapplies the first rotational force on the torque assisting tool 42 which, in turn, generates the second rotational force on the at the lug nuts 40d to loosen and disengage the outer wheel 34b. Such alternative method may be used when the outer wheel 34b is free from being frozen and/or fixed to the inner hub 38 as compared to the method of simultaneously removing the draw bolt 40b and the outer wheel 34b discussed above.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A dual wheel removal tool, comprising:
   a torque plate having a first end, a second end opposite to the first end, and a peripheral edge defined therebetween, wherein the torque plate is adapted to engage with at least two lug nuts of a dual wheel system of a vehicle;
   a socket operably engaged with the torque plate at one of the first end and the second end and being adapted to engage with a draw bolt of an axle extension assembly of the dual wheel system; the socket having:
   a driver; and
   an extension operably engaged with the driver and the torque plate and having a first end of the extension that operably engages with the driver of the socket, a second end of the extension opposite to the first end of the extension and operably engages with and positioned inside of the torque plate, and a passageway defined between the first end of the extension and the second end of the extension;
   wherein the driver is spaced apart from the torque plate by the extension; and
   at least two lug cutouts defined in the torque plate and extends into the peripheral edge between the first end and the second end.

2. The dual wheel removal tool of claim 1, further comprising:
   a central opening defined in the torque plate that extends between a front surface of the torque plate and a rear surface of the torque plate; and
   a driver opening defined in the driver that extends between a front end of the driver and a rear end of the driver;
   wherein the central opening and the driver opening are aligned with and operatively in communication with one another.

3. The dual wheel removal tool of claim 2, wherein the driver further comprises:
   a set of internal engagement walls defining the driver opening and configured to engage with the draw bolt of the axle extension assembly of the dual wheel system.

4. The dual wheel removal tool of claim 1, further comprising:
   a central opening defined in the torque plate;
   a driver opening defined in the driver; and
   wherein the passageway, the central opening, and the driver opening are coaxial with one another.

5. The dual wheel removal tool of claim 4, wherein the driver further comprises:
   a set of internal engagement walls defining the driver opening and configured to engage with the draw bolt of the axle extension assembly of the dual wheel system.

6. The dual wheel removal tool of claim 4, further comprising:
   a first inner diameter defined by the driver opening; and
   a second inner diameter defined by the passageway that is greater than first inner diameter.

7. The dual wheel removal tool of claim 4, further comprising:
   a first outer diameter defined by the torque plate;
   a second outer diameter defined by the extension that is less than the first diameter; and
   a third outer diameter defined by the driver that is less than the first diameter and is greater than the second diameter.

8. The dual wheel removal tool of claim 1, wherein the lug cutouts are curvilinear-shaped.

9. A method of disengaging an outer wheel from a dual wheel drive system of a vehicle, comprising steps of:
- engaging a dual wheel removal tool with an axle extension assembly of the dual wheel, wherein the axle extension assembly supports the outer wheel and operably engages with an inner hub of the dual wheel drive system that support an inner wheel of the vehicle, the dual wheel removal tool comprising:
  - a torque plate having a first end, a second end opposite to the first end, and a peripheral edge defined therebetween, wherein the torque plate is adapted to engage with at least two lug nuts of the dual wheel drive system of the vehicle;
  - a socket operably engaged with the torque plate at one of the first end and the second end and being adapted to engage with a draw bolt of the axle extension assembly of the dual wheel drive system; the socket having:
    - a driver; and
    - an extension operably engaged with the driver and the torque plate and having a first end of the extension that operably engages with the driver of the socket, a second end of the extension opposite to the first end of the extension and operably engages with and positioned inside of the torque plate, and a passageway defined between the first end of the extension and the second end of the extension;
    - wherein the driver is spaced apart from the torque plate by the extension; and
  - at least two lug cutouts defined in the torque plate and extends into the peripheral edge between the first end and the second end;
- engaging a torque assisting tool with the axle extension assembly;
- applying a first rotational force on the dual wheel removal tool and the axle extension assembly with the torque assisting tool; and
- disengaging the outer wheel and the axle extension assembly, collectively, from the inner hub of the dual wheel drive system.

10. The method of claim 9, wherein the step of engaging the dual wheel removal tool with the axle extension assembly of the dual wheel further comprises:
- engaging the socket of the dual wheel removal tool with a draw bolt of the axle extension assembly; and
- engaging the torque plate of the dual wheel removal tool with at least two lug nuts secured to at least two lug studs of a draw cone of the axle extension assembly.

11. The method of claim 10, wherein the step of applying the first rotational force on the dual wheel removal tool and the axle extension assembly further comprises:
- applying the first rotational force on the draw bolt by the socket of the dual wheel removal tool and on the at least two lug nuts and the at least two lug studs by the torque plate of the dual wheel removal tool, simultaneously.

12. The method of claim 9, wherein the step of engaging the dual wheel removal tool with the axle extension assembly of the dual wheel further comprises:
- engaging the socket of the dual wheel removal tool with a draw bolt of the axle extension assembly.

13. The method of claim 12, wherein the step of applying the first rotational force on the dual wheel removal tool and the axle extension assembly further comprises:
- applying the first rotational force on the draw bolt by the socket of the dual wheel removal tool to loosen from the inner hub of the dual wheel drive system.

14. The method of claim 13, wherein the step of engaging the dual wheel removal tool with the axle extension assembly of the dual wheel further comprises:
- engaging the torque plate of the dual wheel removal tool with at least two lug nuts secured to at least two lug studs of a draw cone of the axle extension assembly.

15. The method of claim 14, further comprising:
- applying a second rotational force on the draw bolt by the socket of the dual wheel removal tool and on the at least two lug nuts and the at least two lug studs by the torque plate of the dual wheel removal tool, simultaneously.

* * * * *